(12) United States Patent
Ishii et al.

(10) Patent No.: US 8,161,317 B2
(45) Date of Patent: *Apr. 17, 2012

(54) STORAGE SYSTEM AND CONTROL METHOD THEREOF

(75) Inventors: Kenji Ishii, Ninomiya (JP); Akira Murotani, Odawara (JP); Tetsuya Abe, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 312 days.

This patent is subject to a terminal disclaimer.

(21) Appl. No.: 12/457,146

(22) Filed: Jun. 2, 2009

(65) Prior Publication Data

US 2009/0240992 A1    Sep. 24, 2009

Related U.S. Application Data

(63) Continuation of application No. 11/412,961, filed on Apr. 28, 2006, now Pat. No. 7,558,988.

(30) Foreign Application Priority Data

Feb. 10, 2006    (JP) .................................. 2006-033905

(51) Int. Cl.
   *G06F 11/00* (2006.01)
(52) U.S. Cl. .......................................... 714/5.1; 714/42
(58) Field of Classification Search .................... 714/5.1, 714/5.11, 42, 14, 23–25, 54; 711/100, 154; 713/100

See application file for complete search history.

(56) References Cited

U.S. PATENT DOCUMENTS

| | | | |
|---|---|---|---|
| 5,283,792 A * | 2/1994 | Davies et al. .................. | 714/22 |
| 5,414,861 A * | 5/1995 | Horning ......................... | 365/229 |
| 5,884,055 A | 3/1999 | Tung et al. | |
| 6,098,128 A | 8/2000 | Velez-McCaskey et al. | |
| 6,199,180 B1 | 3/2001 | Ote et al. | |
| 6,583,947 B1 | 6/2003 | Hakamata et al. | |
| 7,263,581 B2 | 8/2007 | Chen | |
| 7,382,559 B2 | 6/2008 | Ogawa et al. | |

(Continued)

FOREIGN PATENT DOCUMENTS

JP    2005-157710    11/2003

OTHER PUBLICATIONS

Schwarz, Thomas J. E., et al.; Disk Scrubbing in Large Archival Storage Systems; Proceedings of the IEEE Computer Society's 12$^{th}$ Annual International Symposium on Modeling, Analysis, and Simulation of Computer and Telecommunications Systems (Mascots '04); 2004.

(Continued)

*Primary Examiner* — Dieu-Minh Le
(74) *Attorney, Agent, or Firm* — Foley & Lardner LLP

(57) ABSTRACT

Provided is a storage system, including: one or more disk drives storing data; a disk controller for controlling data access to the disk drive; a power supply controller for autonomously turning off a power source of the disk drive according to the data access status to the disk drive, and autonomously turning on the power source of the disk drive, which was turned off, after the lapse of a prescribed period from the time the power source was turned off irrespective of the data access status to the disk drive; and a media inspection unit for inspecting a failure in the disk drive in which the power source thereof was autonomously turned on irrespective of the data access status to the disk drive.

10 Claims, 13 Drawing Sheets

U.S. PATENT DOCUMENTS

| | | |
|---|---|---|
| 2002/0144057 A1 | 10/2002 | Li et al. |
| 2004/0246855 A1 | 12/2004 | Kobayashi |
| 2005/0111249 A1 | 5/2005 | Yagisawa et al. |
| 2005/0228943 A1 | 10/2005 | DeCenzo et al. |
| 2005/0283682 A1 | 12/2005 | Odawara et al. |

OTHER PUBLICATIONS

European Patent Office extended search report on application No. 06254510.8 dated May 9, 2011; 8 pages.

* cited by examiner

DISK DRIVE ARRAY TABLE

| | ROW 1 | ROW 2 | ROW 3 | ROW 4 | ROW 5 |
|---|---|---|---|---|---|
| DISK BOX 1 | 1-1 | 1-2 | 1-3 | 1-4 | 1-5 |
| DISK BOX 2 | 2-1 | 2-2 | 2-3 | 2-4 | 2-5 |
| DISK BOX 3 | 3-1 | 3-2 | 3-3 | 3-4 | 3-5 |
| DISK BOX 4 | 4-1 | 4-2 | 4-3 | 4-4 | 4-5 |
| DISK BOX 5 | 5-1 | 5-2 | 5-3 | 5-4 | 5-5 |

RAID CONFIGURATION MANAGEMENT TABLE

| RG NUMBER | RAID LEVEL | HDD CONFIGURATION | | | | |
|---|---|---|---|---|---|---|
| RG1 | RAID5(4D+1P) | 1-1 | 1-2 | 1-3 | 1-4 | 1-5 |
| RG2 | RAID5(4D+1P) | 2-1 | 2-2 | 2-3 | 2-4 | 2-5 |
| RG3 | RAID5(3D+1P) | 3-1 | 3-2 | 3-3 | 3-4 | |
| SPARE 1 | SPARE | 3-5 | | | | |
| RG4 | RAID5(3D+1P) | 4-1 | 4-2 | 4-3 | 4-4 | |
| SPARE 2 | SPARE | 4-5 | | | | |
| RG5 | RAID5(3D+1P) | 5-1 | 5-2 | 5-3 | 5-4 | |
| UNUSED 1 | UNUSED | 5-5 | | | | |
| | | | | | | |
| | | | | | | |
| | | | | | | |

INSPECTION LEVEL MANAGEMENT TABLE 60

| RG NUMBER | INSPECTION LEVEL |
|---|---|
| RG1 | 1 |
| RG2 | 3 |
| RG3 | 2 |
| SPARE 1 | 4 |
| RG4 | 1 |
| SPARE 2 | 4 |
| RG5 | 2 |
| UNUSED 1 | 4 |

INSPECTION PROCESSING MANAGEMENT TABLE 70

| INSPECTION ORDER | RG NUMBER | INSPECTED FINAL LBA | INSPECTION COMPLETION TIME | HOST I/O LAST ACCESS TIME | INSPECTION LEVEL |
|---|---|---|---|---|---|
| 1 | | | | | |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |

FIG. 6

INSPECTION PROCESSING MANAGEMENT TABLE 70

| INSPECTION ORDER | RG NUMBER | INSPECTED FINAL LBA | INSPECTION COMPLETION TIME | HOST I/O LAST ACCESS TIME | INSPECTION LEVEL |
|---|---|---|---|---|---|
| 1 | RG1 | 0 | | | |
| 2 | RG2 | 0 | | | |
| 3 | RG3 | 0 | | | |
| 4 | SPARE 1 | 0 | | | |
| 5 | RG4 | 0 | | | |
| 6 | SPARE 2 | 0 | | | |
| 7 | RG5 | 0 | | | |
| 8 | UNUSED 1 | 0 | | | |
| 9 | | | | | |
| 10 | | | | | |
| 11 | | | | | |
| | | | | | |

FIG. 7

INSPECTION PROCESSING MANAGEMENT TABLE 70

| INSPECTION ORDER | RG NUMBER | INSPECTED FINAL LBA | INSPECTION COMPLETION TIME | HOST I/O LAST ACCESS TIME | INSPECTION LEVEL |
|---|---|---|---|---|---|
| 1 | RG1 | 100000 | 2005/12/05 20:30:00 | | |
| 2 | RG2 | 100000 | 2005/12/05 21:20:00 | | |
| 3 | RG3 | 0 | | | |
| 4 | SPARE 1 | 0 | | | |
| 5 | RG4 | 0 | | 2005/12/04 09:34:43 | |
| 6 | SPARE 2 | 0 | | | |
| 7 | RG5 | 0 | | | |
| 8 | UNUSED 1 | 0 | | | |
| 9 | | | | | |
| 10 | | | | | |
| 11 | | | | | |
| | | | | | |

FIG.8

DISK DRIVE ATTRIBUTE TABLE  80

| | PRIORITY | HDD1-1 | HDD1-2 | HDD1-3 | HDD1-4 | HDD1-5 |
|---|---|---|---|---|---|---|
| PRIORITY | | | | | | |
| VENDOR NAME | 4 | COMPANY A | COMPANY A | COMPANY B | COMPANY A | COMPANY A |
| HDD TYPE | 3 | ATA | ATA | ATA | ATA | ATA |
| STORAGE CAPACITY | 5 | 250GB | 250GB | 250GB | 250GB | 250GB |
| MODEL NAME | 2 | HD250 | HD250 | VT25R | HD250 | HD250 |
| LOT NUMBER | 1 | HD250_0435i | HD250_0435i | VT25R_20050i | HD250_0435i | HD250_0435i |
| SERIAL NUMBER | | 10010 | 10011 | 5001 | 10013 | 10014 |
| FIRMWARE REVISION | | V010 | V010 | Va3 | V010 | V010 |
| ACTIVATION COUNT | 7 | 10 | 10 | 1 | 10 | 10 |
| TOTAL OPERATING TIME | 8 | 1142hr | 1142hr | 196hr | 1142hr | 1142hr |
| PREVIOUS INSPECTION DATE | - | 05/10/10 02:13 | 05/10/10 02:13 | 05/10/10 02:13 | 05/10/10 03:20 | 05/10/10 03:20 |
| INSPECTED FINAL LBA | - | 5378124 | 5378124 | 5378124 | 5378124 | 5378124 |
| USER DATA STORED | - | yes | yes | yes | no | no |
| | | HDD2-1 | HDD2-2 | HDD2-3 | HDD2-4 | HDD2-5 |
| VENDOR NAME | | COMPANY A | COMPANY A | COMPANY A | COMPANY A | COMPANY A |
| HDD TYPE | | ATA | ATA | ATA | ATA | ATA |
| STORAGE CAPACITY | | 250GB | 250GB | 250GB | 250GB | 250GB |
| MODEL NAME | | HD250 | HD250 | HD250 | HD250 | HD250 |
| LOT NUMBER | | HD250_0435i | HD250_0435i | HD250_0435i | HD250_0435i | HD250_0435i |
| SERIAL NUMBER | | 10015 | 10016 | 10017 | 10018 | 10019 |
| FIRMWARE REVISION | | V010 | V010 | V010 | V010 | V010 |
| ACTIVATION COUNT | | 10 | 10 | 10 | 10 | 10 |
| TOTAL OPERATING TIME | | 1142hr | 1142hr | 1142hr | 1142hr | 1142hr |
| PREVIOUS INSPECTION DATE | | 05/10/10 02:13 | 05/10/10 02:13 | 05/10/10 03:20 | 05/10/10 03:20 | 05/10/10 03:20 |
| INSPECTED FINAL LBA | | 5378124 | 5378124 | 5378124 | 5378124 | 5378124 |
| USER DATA STORED | | yes | yes | no | no | no |
| | | HDD3-1 | HDD3-2 | HDD3-3 | HDD3-4 | HDD3-5 |
| VENDOR NAME | | COMPANY A | COMPANY A | COMPANY B | COMPANY A | COMPANY A |
| HDD TYPE | | ATA | ATA | ATA | ATA | ATA |
| STORAGE CAPACITY | | 250GB | 250GB | 250GB | 250GB | 250GB |
| MODEL NAME | | HD250 | HD250 | VT25R | HD250 | HD250 |
| LOT NUMBER | | HD250_0435i | HD250_0435i | VT25R_20050i | HD250_0435i | HD250_0435i |
| SERIAL NUMBER | | 10020 | 10021 | 5002 | 10024 | 10025 |
| FIRMWARE REVISION | | V010 | V010 | Va3 | V010 | V010 |
| ACTIVATION COUNT | | 10 | 10 | 1 | 10 | 10 |
| TOTAL OPERATING TIME | | 1142hr | 1142hr | 196hr | 1142hr | 1142hr |
| PREVIOUS INSPECTION DATE | | 05/10/10 02:13 | 05/10/10 02:13 | 05/10/10 02:13 | 05/10/10 03:20 | 05/10/10 03:20 |
| INSPECTED FINAL LBA | | 5378124 | 5378124 | 5378124 | 5378124 | 5378124 |
| USER DATA STORED | | yes | yes | yes | no | no |
| | | HDD4-1 | HDD4-2 | HDD4-3 | HDD4-4 | HDD4-5 |
| VENDOR NAME | | COMPANY A | COMPANY A | COMPANY A | COMPANY A | COMPANY B |
| HDD TYPE | | ATA | ATA | ATA | ATA | ATA |
| STORAGE CAPACITY | | 250GB | 250GB | 250GB | 250GB | 250GB |
| MODEL NAME | | HD250 | HD250 | HD250 | HD250 | VT25R |
| LOT NUMBER | | HD250_0435i | HD250_0435i | HD250_0435i | HD250_0435i | VT25R_20050i |
| SERIAL NUMBER | | 10026 | 10027 | 10028 | 10029 | 5003 |
| FIRMWARE REVISION | | V010 | V010 | V010 | V010 | Va3 |
| ACTIVATION COUNT | | 10 | 10 | 10 | 10 | 1 |
| TOTAL OPERATING TIME | | 1142hr | 1142hr | 1142hr | 1142hr | 196hr |
| PREVIOUS INSPECTION DATE | | 05/10/10 02:13 | 05/10/10 02:13 | 05/10/10 03:20 | 05/10/10 03:20 | 05/10/10 02:13 |
| INSPECTED FINAL LBA | | 5378124 | 5378124 | 5378124 | 5378124 | 5378124 |
| USER DATA STORED | | yes | yes | no | no | yes |
| | | HDD5-1 | HDD5-2 | HDD5-3 | HDD5-4 | HDD5-5 |
| VENDOR NAME | | COMPANY A | COMPANY A | COMPANY B | COMPANY A | COMPANY A |
| HDD TYPE | | ATA | ATA | ATA | ATA | ATA |
| STORAGE CAPACITY | | 250GB | 250GB | 250GB | 250GB | 250GB |
| MODEL NAME | | HD250 | HD250 | VT25R | HD250 | HD250 |
| LOT NUMBER | | HD250_0435i | HD250_0435i | VT25R_20050i | HD250_0435i | HD250_0435i |
| SERIAL NUMBER | | 10031 | 10032 | 5004 | 10034 | 10035 |
| FIRMWARE REVISION | | V010 | V010 | Va3 | V010 | V010 |
| ACTIVATION COUNT | | 10 | 10 | 1 | 10 | 10 |
| TOTAL OPERATING TIME | | 1142hr | 1142hr | 196hr | 1142hr | 1142hr |
| PREVIOUS INSPECTION DATE | | 05/10/10 02:13 | 05/10/10 02:13 | 05/10/10 02:13 | 05/10/10 03:20 | 05/10/10 03:20 |
| INSPECTED FINAL LBA | | 5378124 | 5378124 | 5378124 | 5378124 | 5378124 |
| USER DATA STORED | | yes | yes | yes | no | no |

STORAGE SYSTEM AND CONTROL METHOD THEREOF

CROSS-REFERENCES TO RELATED APPLICATIONS

This application is a Continuation Application from U.S. Ser. No. 11/412,961 filed Apr. 28, 2006 now U.S. Pat. No. 7,558,988. Priority is claimed from U.S. Ser. No. 11/412,961 filed Apr. 28, 2006, which claims priority to Japanese Patent Application No. 2006-033905, filed on Feb. 10, 2006, the entire disclosure of which is incorporated herein by reference.

BACKGROUND

The present invention relates to a storage system and the control method thereof.

In recent years, data life cycle management (DLCM) is attracting attention as a method for managing a storage system. DLCM is a concept of realizing a more cost efficient data management method by managing data migration between storage systems according to the value of data that changes with time. For instance, since an email system is positioned as a mission-critical system of enterprises, it is necessary to use a high-end storage system having high performance and high reliability. Since the access frequency will decrease with emails that are few weeks old, data is migrated from the high-end storage system to a nearline storage system. Although a nearline storage system is inferior to a high-end storage system in terms of performance and reliability, there is a merit in that it is inexpensive, and instant access is possible as required. And, after the lapse of 1 to 2 years after the migration of data to the nearline storage system, such data is migrated to a tape medium and stored in a cabinet. In order to reduce the data management cost based on the concept of DLCM, the management of data migration is important.

Japanese Patent Laid-Open Publication No. 2005-157710 discloses, as technology for taking the concept of DLCM one step further, technology referred to as MAID (Massive Arrays of Inactive Disks) for reducing the power consumption by shutting off disk drives that are not accessed for a long period of time. Pursuant to the increase of storage capacity demanded in a disk array system, the number of disk drives to be mounted is of an exponentially increasing trend, and the power consumption of the disk array system can be effectively reduced by employing the MAID technology.

SUMMARY

Nevertheless, since it is not possible to detect a failure in the disk drive during the period such disk drive is shut off, if the shutoff period of the disk drive extends over a long period of time, problems arise in that the drive cannot be activated or the occurrence of a data error is detected when operating the shutoff disk drive when it is accessed from the host. When a plurality of disk drives are managed in RAID 5, data cannot be recovered if a failure occurs in two or more disk drives in the same RAID group.

Thus, an object of the present invention is to overcome the foregoing problems, and to prevent data loss from occurring by discovering a failure in the disk drive at an early stage.

In order to achieve the foregoing object, the storage system of the present invention includes: one or more disk drives storing data; a disk controller for controlling data access to the disk drive; a power supply controller for autonomously turning off a power source of the disk drive according to the data access status to the disk drive, and autonomously turning on the power source of the disk drive, which was turned off, after the lapse of a prescribed period from the time the power source was turned off irrespective of the data access status to the disk drive; and a media inspection unit for inspecting a failure in the disk drive in which the power source thereof was autonomously turned on irrespective of the data access status to the disk drive.

The power supply controller selects the disk drive for turning on the power source irrespective of the data access status to the disk drive based on a predefined policy. A policy, for instance, is to (1) preferentially select a disk drive containing attribute information that coincides with or is similar to attribute information of the disk drive subject to a failure; (2) preferentially select a disk drive containing attribute information that coincides with or is similar to attribute information with high priority among the attribute information of the disk drive subject to a failure; (3) periodically turn on a power source of the disk drive in a prescribed inspection cycle irrespective of the data access status to the disk drive (here, it is desirable that the inspection cycle differs according to the disk drive type); and (4) exclude the disk drive, in which a prescribed period has not elapsed from the latest data access from the disk controller, from the target of media inspection.

Here, attribute information of a disk drive is, for example, one among a vendor name, disk drive type, storage capacity, model name, lot number, firmware revision, activation count, total operating time, previous inspection date, inspected final LBA, and status of user data stored of the disk drive.

The media inspection unit inspects a failure in the disk drive based on a predefined policy. A policy, for instance, is to (1) read the entire storage area of all disk drives belonging to the same RAID group, and inspect a failure; (2) read a part of the storage area of a plurality of disk drives belonging to the same RAID group, and inspect a failure; (3) check whether a plurality of disk drives belonging to the same RAID group can enter a ready state; (4) read a part of the storage area of all disk drives belonging to the same RAID group, and inspect a failure; (5) check whether all disk drives belonging to the same RAID group can enter a ready state; (6) read the entire storage area of one disk drive among a plurality of disk drives belonging to the same RAID group, and inspect a failure; (7) read a part of the storage area of one disk drive among a plurality of disk drives belonging to the same RAID group, and inspect a failure; and (8) check whether one disk drive among a plurality of disk drives belonging to the same RAID group can enter a ready state.

According to the present invention, since the power source of the disk drive which was turned off according to the data access status is autonomously turned on irrespective of the data access status in order to inspect a failure in the disk drive, it is possible to prevent data loss from occurring by discovering a failure in the disk drive at an early stage.

DESCRIPTION OF THE DRAWINGS

FIG. 6 is an explanatory diagram of an inspection processing management table when the inspection order is decided;

FIG. 7 is an explanatory diagram of an inspection processing management table during the performance of inspection processing;

FIG. 8 is an explanatory diagram of a disk drive attribute table;

DETAILED DESCRIPTION

Embodiments of the present invention are now explained with reference to the drawings.

Figure 1:
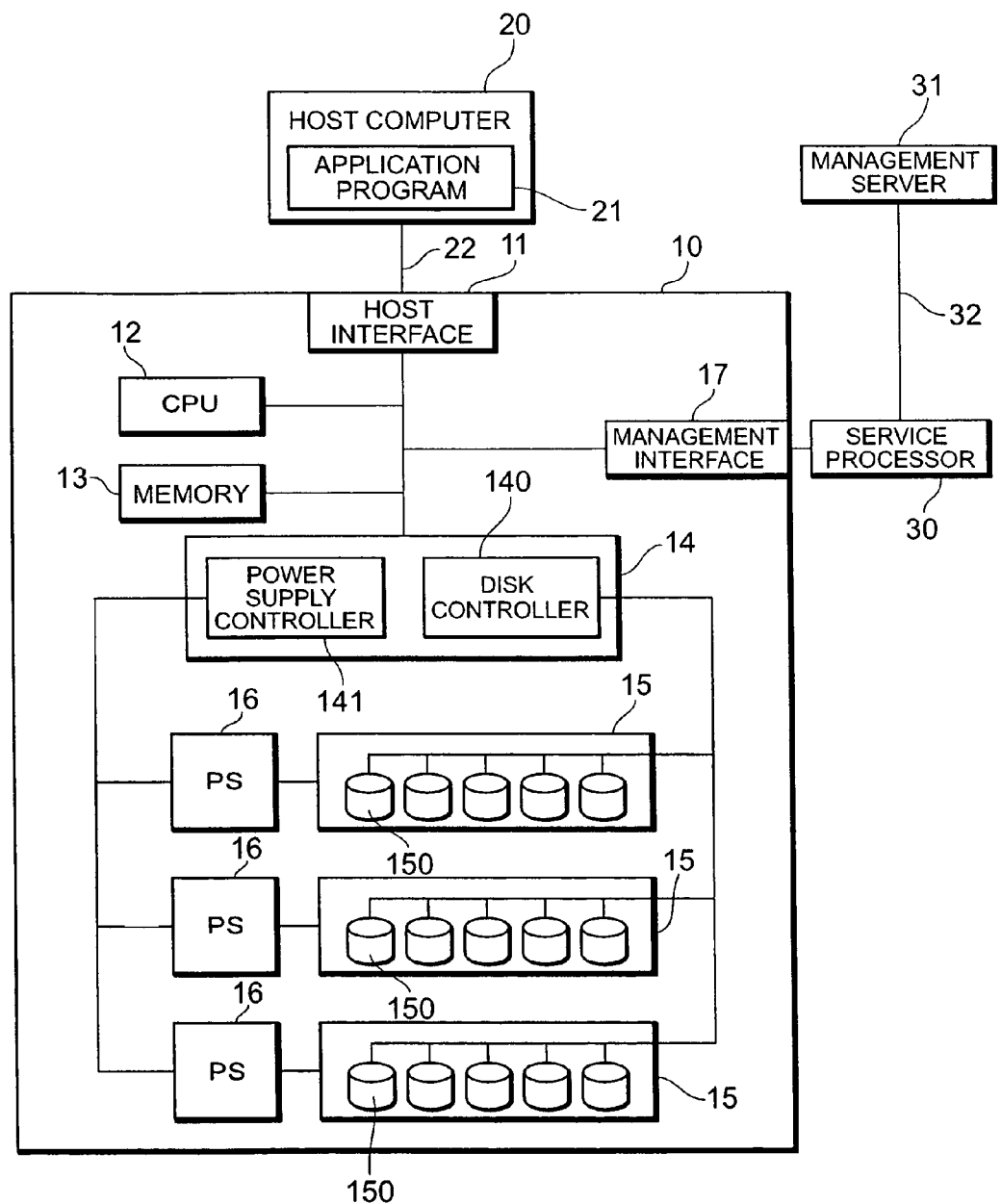
FIG. 1 is a hardware configuration of a storage system pertaining to the present embodiment.

FIG. 1 shows the hardware configuration of a storage system 10 pertaining to the present embodiment. The storage system 10 is connected to one or more host computers 20 via a communication network 22. The storage system 10 is a disk array system having a plurality of disk drives 150 configured in RAID.

The host computer 20 is a workstation system, mainframe computer, personal computer or the like. The host computer 20 has a business application program 21. The application program 21, for instance, is database software, Web application software, streaming application software, e-business application software and the like.

The communication network 22 is configured, for instance, from a SAN (Storage Area Network), LAN (Local Area Network), WAN (Wide Area Network), Internet, dedicated line, public line or the like. When the host computer 20 is connected to the storage system 10 via a SAN, the host computer 20 requests the input and output of data in block units to the storage system 10 based on a fibre channel protocol or iSCSI (internet Small Computer System Interface) protocol. When the host computer 20 is connected to the storage system 10 via a LAN, the host computer 20 designates a file name and requests the input and output of data in file units to the storage system 10 based on a file transfer protocol such as NFS (Network File System) or CIFS (Common Internet File System). For the storage system 10 to receive a file access request from the host computer 20, the storage system 10 must be equipped with the NAS (Network Attached Storage) function.

The storage system 10 has a host interface 11, a CPU 12, a memory 13, a disk interface 14, a plurality of disk boxes 15, a plurality of power source devices 16, and a management interface 17. The disk interface 14 has a disk controller 140 and a power supply controller 141. Each disk box 15 is equipped with a plurality of disk drives 150.

The host interface 11 is a controller for controlling the interface between the storage system 10 and host computer 20, and, for instance, processes a data I/O request in block units based on a fibre channel protocol or iSCSI protocol, or processes a data I/O request in file units based on a file transfer protocol such as NFS or CIFS. Incidentally, the host interface 11 may also be referred to as a channel interface.

The CPU 12 is a processor for controlling the I/O processing (write access or read access) to the plurality of disk drives 150 in reply to a data I/O request from the host computer 51. The CPU 12 functions as a media inspection unit for performing the media inspection processing described later.

The memory 13 is loaded with various micro programs required for controlling the disk drives 150, and also stores the various tables described later (disk drive array table 40, RAID configuration management table 50, inspection level management table 60, inspection processing management table 70, and disk drive attribute table 80).

The disk controller 140 controls the plurality of disk drives 150 based on a RAID level (e.g., 0, 1, 5) prescribed in a so-called RAID system. In the RAID system, the plurality of disk drives 150 are managed as a single RAID group. A plurality of logical units, which are access units from the host computer 20, are defined in the RAID group. The respective logical units are assigned a LUN (Logical Unit Number). Incidentally, the disk interface 14 may also be referred to as a drive interface.

The power supply controller 141 turns on/off the power source of the respective disk drives 150 loaded into the disk box 15. The power supply controller 141 autonomously turns off the power source of the disk drive 150 according to the data access status to the disk drive 150. For example, when the access frequency to the disk drive 150 decreases, the power supply controller 141 autonomously turns off the power source of the disk drive 150. The power supply controller 141 autonomously turns on the power source of the whole or a part of the disk drives belonging to the same RAID group, which was turned off, after the lapse of a prescribed period from the time the power source was turned off irrespective of the data access status to the disk drives for the purpose of performing the media inspection processing described later.

Incidentally, in the foregoing explanation, although an example was illustrated where the plurality of disk drives 50 are configured in RAID, if the plurality of disk drives 150 are not configured in RAID, the power supply controller 141 may turn on/off the power source device 16 for each disk drive 150.

The disk drive 150 is a storage device such as a FC (Fibre Channel) disk drive, SATA (Serial Advanced Technology Attachment) disk drive, PATA (Parallel Advanced Technology Attachment) disk drive, FATA (Fibre Attached Technology Adapted) disk drive, SAS (Serial Attached SCSI) disk drive or SCSI (Small Computer System Interface) disk drive. As a substitute for the disk drive 150, a storage device such as a magnetic tape drive or semiconductor memory drive may also be used.

The storage system 10 classifies each disk drive 150 (or each RAID group) into a plurality of storage hierarchies. For example, a certain storage hierarchy is definable as a highly reliable FC hierarchy. For instance, one or more RAID groups configuring a plurality of FC disk drives in RAID 1 is definable as an FC hierarchy. Another storage hierarchy is definable as a low-cost SATA hierarchy. For example, one or more RAID groups configuring a plurality of SATA disk drives 44 in RAID 5 is definable as a SATA hierarchy.

Incidentally, definition of the storage hierarchy is not limited to the foregoing examples, and the storage hierarchy can also be defined according to the specification of the disk drive 150. For example, the storage hierarchy may be categorized between high rotation FC disk drives and low rotation FC disk drives, or the storage hierarchy may be categorized between large storage capacity FC disk drives and small storage capacity FC disk drives. Further, the storage hierarchy may also be categorized according to the type of storage device (e.g., hard disk drives, flexible disk drives, magnetic tape drives, semiconductor memory drives, optical disk drives and so on).

Each power source device 16 supplies power to the disk drives 150 loaded into each disk box 15. The power source device 16 has an AC/DC converter for converting an alternate current power source (commercial power source) into a direct current power source, and a battery module as an auxiliary power source.

The service processor 30 is connected to the management interface 17. The management server 31 is connected to the service processor 30 via the management LAN 32. The management LAN 32, for instance, is the Internet, dedicated line or the like. Communication between the management server 31 and service processor 30 via the management LAN 32, for example, is conducted based on a communication protocol such as TCP/IP.

The service processor 30 and management server 31 are both management terminals for maintaining and managing the storage system 10, and have a management user interface. The system administrator transmits commands for managing the storage system 10 to the storage system 10 via the service processor 30 by performing input operations with the management server 3. As commands for managing the storage system 10, for instance, considered may be a command for adding or removing disk drives 150 or instructing the change in the RAID configuration, a command for configuring a communication path between the host computer 20 and storage system 10, a command for installing a micro program of the CPU 12 in the memory 13, among others.

Next, outline of the processing for inspecting the status of failure in the disk drives 150 (hereinafter referred to as "media inspection processing") is explained. When the data access frequency to the disk drives 150 decreases, the power supply controller 141 autonomously turns off the power source of the disk drives 150. The power supply controller 141 autonomously turns on the power source of the whole or a part of the disk drives 150 belonging to the same RAID group, which was turned off, after the lapse of a prescribed period from the time the power source was turned off irrespective of the data access status to the disk drives 150 for the purpose of performing the media inspection processing. The CPU 12 checks a failure in the whole or a part of the disk drives 150 belonging to the same RAID group, in which the power source thereof was autonomously turned on, irrespective of the data access status to the disk drive 150.

Here, the power supply controller 141 selects the disk drive 150 for autonomously turning on the power source irrespective of the data access status based on a predefined policy. A policy is an implementation standard of the media inspection processing. As specific examples of a policy, for instance, considered may be the acts of (1) performing media inspection on all disk drives 150 periodically (e.g., once a month), (2) preferentially selecting a disk drive 150 having attribute information that coincides with or is similar to attribute information of the disk drive 150 subject to a failure as a result of the media inspection, (3) excluding a disk drive 150, in which a prescribed period has not elapsed from the latest data access from the disk controller 140, from the media inspection, among others. Further, the inspection levels described later are also included in the policy.

Next, the media inspection processing is explained in detail with reference to FIG. 2 to FIG. 16.

Figure 2:
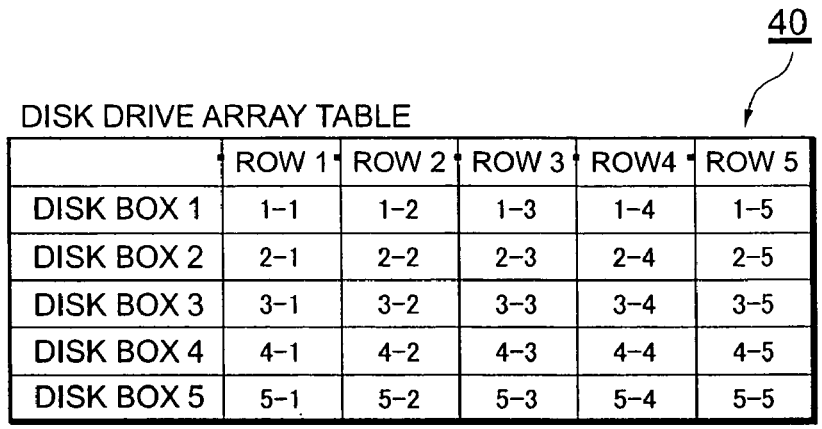
FIG. 2 is an explanatory diagram of a disk drive array table.

FIG. 2 shows a disk drive array table 40. The disk drive array table 40 stores array numbers showing the physical array position of the disk drives 150 loaded in the respective disk boxes 15. For example, array number "M-N" in the disk drive array table 40 represents that the disk drive 150 is loaded in the $N^{th}$ row of the disk box M. Here, the disk box M is the disk box 15 located in the $M^{th}$ position when a plurality of disk boxes 15 are arranged in a single row.

Figure 3:
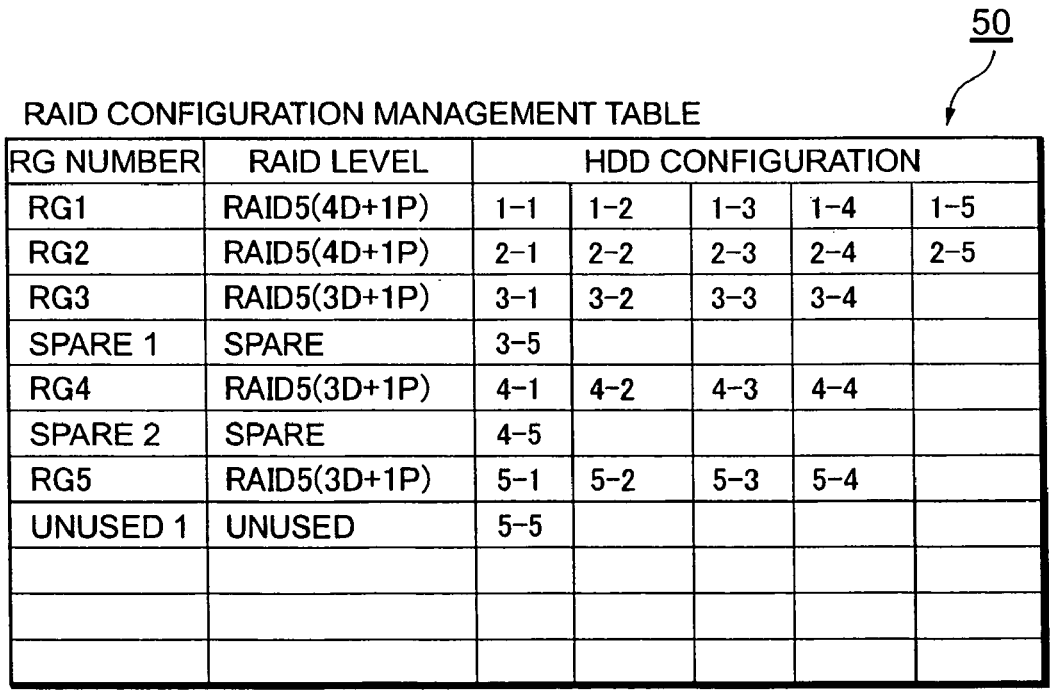
FIG. 3 is an explanatory diagram of a RAID configuration management table.

FIG. 3 shows a RAID configuration management table 50. The RAID configuration management table 50 is used for managing configuration information of each RAID group, and respectively associating and storing RAID group numbers (hereinafter referred to as "RG numbers"), RAID levels, and information on the disk drives 150 configuring the RAID group. The media inspection processing, as a general rule, is to be performed in RAID group units, and, when there is a spare disk drive or an unused disk drive, this may also be performed in spare disk drive units or unused disk drive units. Thus, for the sake of convenience, spare disk drive numbers (hereinafter referred to as "spare disk numbers"), and unused disk drive numbers (hereinafter referred to as "unused disk numbers") are managed by being included in the RG numbers.

For instance, in the example illustrated in FIG. 3, five disk drives 150 of "2-1" to "2-5" are included in the RAID group 2. The RAID level of the RAID group 2 is RAID 5. Four disk drives 140 of "3-1" to "3-4" are included in the RAID group 3. The RAID level of the RAID group 3 is RAID 5. The disk drive 150 of "3-5" is assigned as a spare drive to spare 1. The disk drive 150 of "5-5" is assigned to unused 1 representing that the disk drive is unused.

Figure 4:
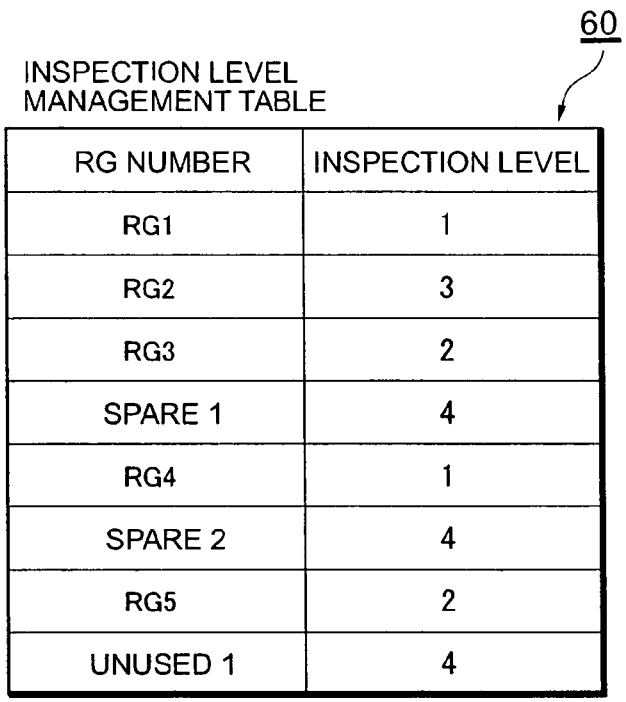
FIG. 4 is an explanatory diagram of an inspection level management table.

FIG. 4 shows an inspection level management table 60. The inspection level management table 60 stores information on the inspection levels of the respective RAID groups. An inspection level is an index value representing the accuracy of the media inspection processing. Level 1 shows that data is read from the entire storage area of all disk drives 150 belonging to the same RAID group in order to check the status of error. Level 2 shows that data is read from a part of the storage area of all disk drives belonging to the same RAID group in order to check the status of error. Level 3 shows that data is read from a part of one disk drive among all disk drives belonging to the same RAID group in order to check the status of error. Level 4 shows to check whether all disk drives belonging to the same RAID group can enter a ready state.

Like this, by configuring an arbitrary inspection level among a plurality of inspection levels regarding the respective RAID groups, it is possible to efficiently check the status of failure in the disk drives 150. For example, for a RAID group configured from highly reliable FC disk drives, by configuring a low inspection level (e.g., level 3 or level 4), it is possible to perform the media inspection processing of the RAID group configured from FC disk drives quickly and with low power consumption. Meanwhile, for a RAID group configured from unreliable SATA disk drives, by configuring a high inspection level (e.g., level 1 or level 2), it is possible to precisely perform media inspection processing of the RAID group configured from SATA disk drives, and discover a failure in a disk drive at an early stage.

Figure 5:
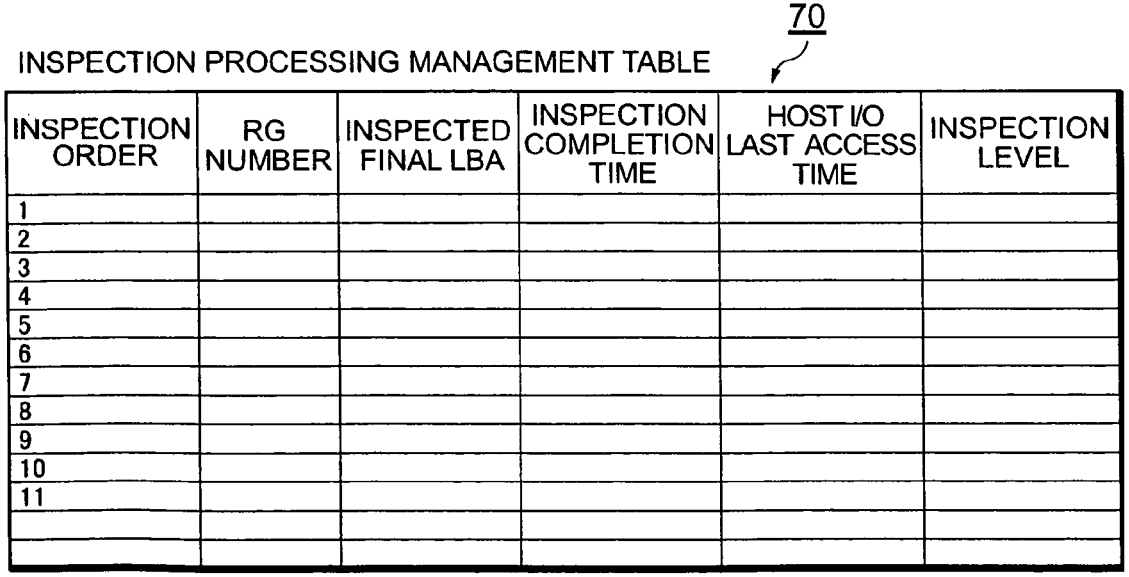
FIG. 5 is an explanatory diagram of an inspection processing management table in an initial state.

FIG. 5 to FIG. 7 show an inspection processing management table 70. The inspection processing management table 70 is used for managing the inspection order or inspection status of the media inspection processing, and respectively associating and storing the inspection order, RG number, logical block address of the last sector block inspected in the previous media inspection processing (hereinafter referred to as the "inspected final LBA"), completion time of the previous media inspection processing, generation time of latest host I/O, and inspection level of the media inspection processing.

Incidentally, FIG. 5 shows the inspection processing management table 70 in the initial state. FIG. 6 shows the inspection processing management table 70 when the inspection order is decided. FIG. 7 shows the inspection processing management table 70 during the performance of inspection processing.

FIG. 8 shows a disk drive attribute table 80. The disk drive attribute table 80 stores attribute information of the respective disk drives 150. As attribute information of the disk drives 150, there are vendor name, HDD type, storage capacity, model name, lot number, serial number, firmware revision, activation count, total operating time, previous inspection date, inspected final LBA, status of user data stored, and so on. HDD type (disk drive type) shows the type of disk drive. For example, when there are two types of disk drives 150; namely, FC disk drives and SATA disk drives, the HDD type will be either an FC disk drive or SATA disk drive. Firmware revision is revision information of disk controller firmware. Activation count shows the number of times the power source of the disk drives 150 has been turned on (number of times power source was input). Total operating time is the sum of the period the power source of the disk drives 150 is turned on and the period the power source of the disk drive 150 is turned off. "HDDM-N" shows the disk drive 150 loaded in the $N^{th}$ row of the disk box M.

"Priority" shows the priority of media inspection processing. The storage system 10 preferentially selects a disk drive 150 having a high priority disk drive attribute and performs media inspection processing thereto. For instance, in the example illustrated in FIG. 8, since the lot number is set to have the highest priority, the storage system 10 preferentially performs media inspection processing to the disk drive 150 having a lot number that is the same as the lot number of the disk drive 150 in which a failure was discovered. Since a plurality of disk drives 150 having the same lot number were manufactured under the same manufacturing environment, this is suitable for the early discovery of failures.

As specific examples of defining a policy based on attribute information of the disk drives 150, the following cases may be considered:

(1) The disk drive 150 to be subject to media inspection processing may be selected based on the disk drive type; for instance, priority is set higher for an unreliable disk drive (e.g., SATA disk drive) in comparison to a highly reliable disk drive (e.g., FC disk drive).

(2) The disk drive 150 to be subject to media inspection processing may be selected based on the total operating time; for instance, priority is set higher for a disk drive 150 having a long total operating time in comparison to a disk drive 150 having a short total operating time.

(3) The disk drive 150 to be subject to media inspection processing may be selected based on the previous inspection date; for instance, priority is set higher for a disk drive 150 having an older previous inspection date in comparison to a disk drive 150 having a recent previous inspection date.

(4) In addition, the disk drive 150 to be subject to media inspection processing may be selected based on a combination of a plurality of pieces of attribute information.

(5) When a plurality of disk drive types of disk drives 150 are loaded in the storage system 10, an inspection cycle of media inspection may be set for each disk drive type; for instance, it would be suitable to set the inspection cycle of a highly reliable disk drive (e.g., FC disk drive) to be long, and to set the inspection cycle of an unreliable disk drive (e.g., SATA disk drive) to be short.

Figure 9:
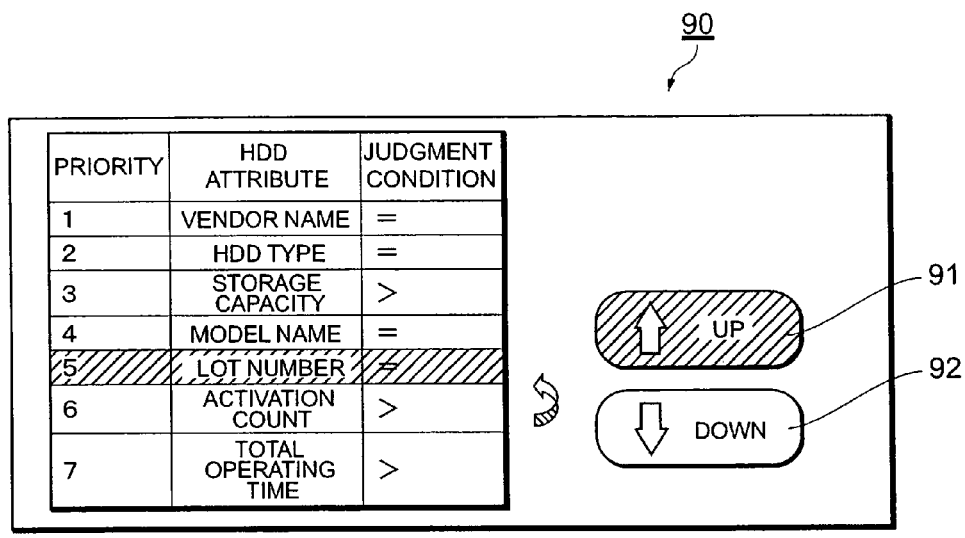
FIG. 9 is an explanatory diagram of a priority editing screen.
Figure 10:
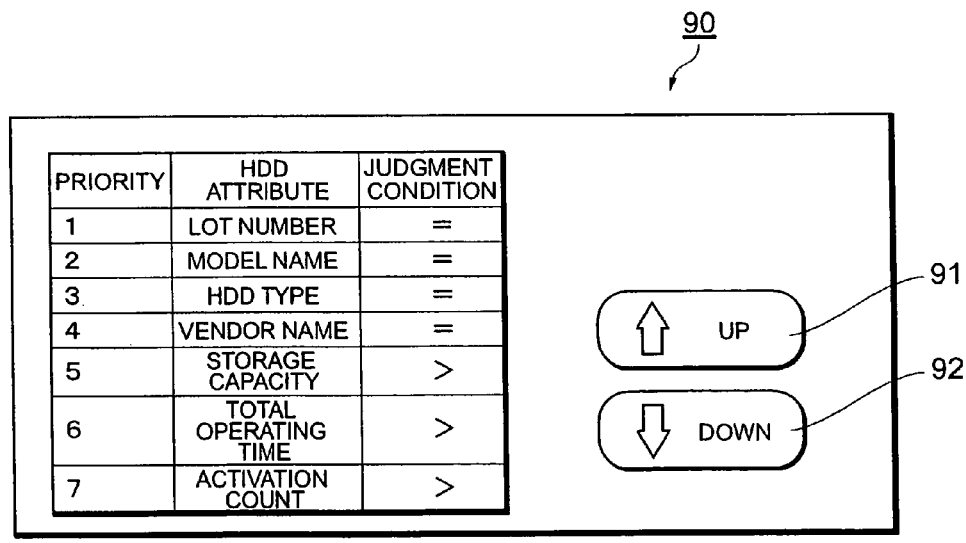
FIG. 10 is an explanatory diagram of a priority editing screen.

FIG. 9 and FIG. 10 show display examples of an editing screen 90 for editing the priority of media inspection processing. By selecting one disk drive attribute among a plurality of disk drive attributes and operating a button 91 or 92, the system administrator is able to change the priority of the selected disk drive attribute. The button 91 is operated when raising the priority, and the button 92 is operated when lowering the priority. For instance, in the example illustrated in FIG. 9, the lot number is selected, and the priority of the lot number is raised with the operation of the button 91. FIG. 10 shows the edited editing screen 90.

Here, "=" of the judgment condition represents consistent conditions, and ">" represents comparative conditions. For example, with vendor name and HDD type, whether the attribute information is consistent is determined based on the consistent conditions. Meanwhile, with storage capacity and activation count, whether the attribute information is consistent is determined based on the comparative conditions.

Incidentally, the system administrator is able to edit the priority of media inspection processing by referring to the editing screen 90 displayed on a user interface of the management terminal (e.g., service processor 30 or management server 30). The system administrator may also edit the priority of media inspection priority by referring to the editing screen 90 displayed on a user interface of a computer (e.g., host computer 51 or another terminal device) connected to the storage system 10.

In the foregoing explanation, although an example was illustrated where the system administrator decided the priority upon respectively designating the attribute information of the disk drives 150, the system administrator may input abstract instructions, and the service processor 30 or management server 30 that received such abstract instructions may specifically set the priority. For example, the system administrator inputs abstract instructions in the service processor 30 or management server 30 for raising the priority of an unreliable disk drive 150. The service processor 30 or management server 30 that received such abstract instructions raises the priority of the disk drive 150 in which the HDD type is a SATA disk drive. Management of the storage system 10 can be facilitated by providing an environment where the system administrator is able to conduct abstract policy management.

Figure 11:
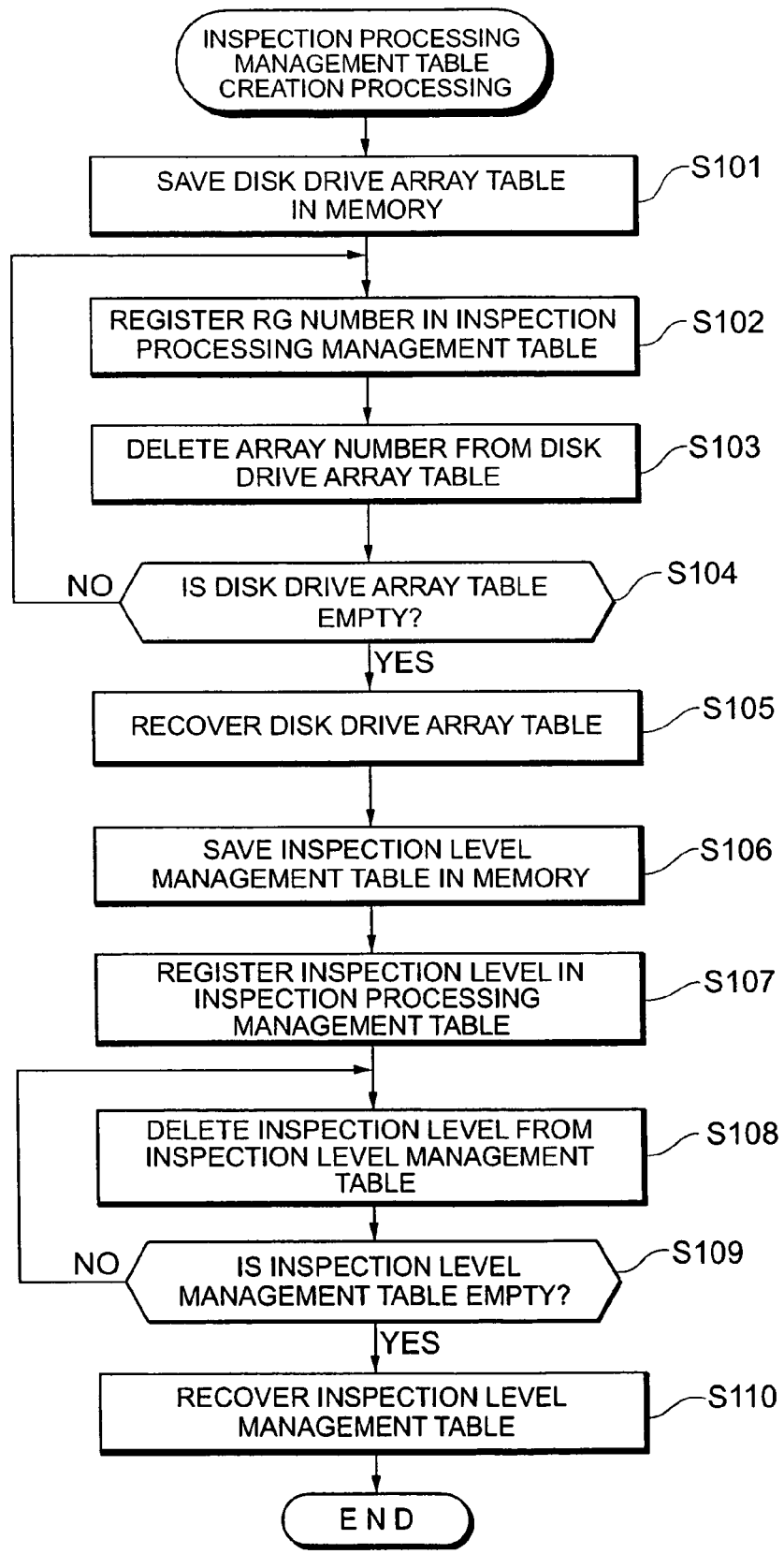
FIG. 11 is a flowchart showing inspection processing management table creation processing.

FIG. 11 is a flowchart showing inspection processing management table creation processing. The inspection processing management table creation processing is executed by the CPU 12 pursuant to the activation of the storage system 10.

When the inspection processing management table creation processing is activated, the CPU 12 saves the disk drive array table 40 in the memory 13 (S101), and registers the RG number, to which belongs a disk drive 150 having the smallest array number among a plurality of array numbers stored in the disk drive array table 40, in a blank space of "inspection order" of the inspection processing management table 70 (S102). Here, when the disk drive 150 having the smallest array number is an unused disk or spare disk, an unused disk number or spare disk number is registered in the blank space of "inspection order" of the inspection processing management table 70.

Next, the CPU 12 deletes from the disk drive array table 40 the array number of all disk drives 150 belonging to the RAID group having the RG number registered in the blank space of "inspection order" of the inspection processing management table 70 (S103).

Next, the CPU 12 determines whether the disk drive array table 40 is empty (S104), and, if it is not empty (S104; NO), the CPU 12 repeatedly executes the loop of S102 to S104. If the disk drive array table 40 is empty (S104; YES), the CPU 12 recovers the disk drive array table 40 (S105).

Next, the CPU 12 saves the inspection level management table 60 in the memory 13 (S106), and sequentially stores the respective inspection levels of the RAID group, spare disk drive and unused disk drive, which are stored in the inspection level management table 60, in a blank space of "inspection level" of the inspection processing management table 70 (S107).

Next, the CPU 12 deletes from the inspection level management table 60 the inspection levels registered in the blank space of "inspection level" of the inspection processing management table 60 (S108).

Next, the CPU 12 determines whether the inspection processing management table 60 is empty (S109), and, if it is not empty (S109; NO), the CPU 12 repeatedly executes the loop of S107 to S109. If the inspection processing management table 60 is empty (S109; YES), the CPU 12 recovers the inspection processing management table 60 (S110).

As a result of performing the foregoing processing steps, the RG number and inspection level will be associated and stored in the inspection processing management table 70 (refer to FIG. 5).

Figure 12:
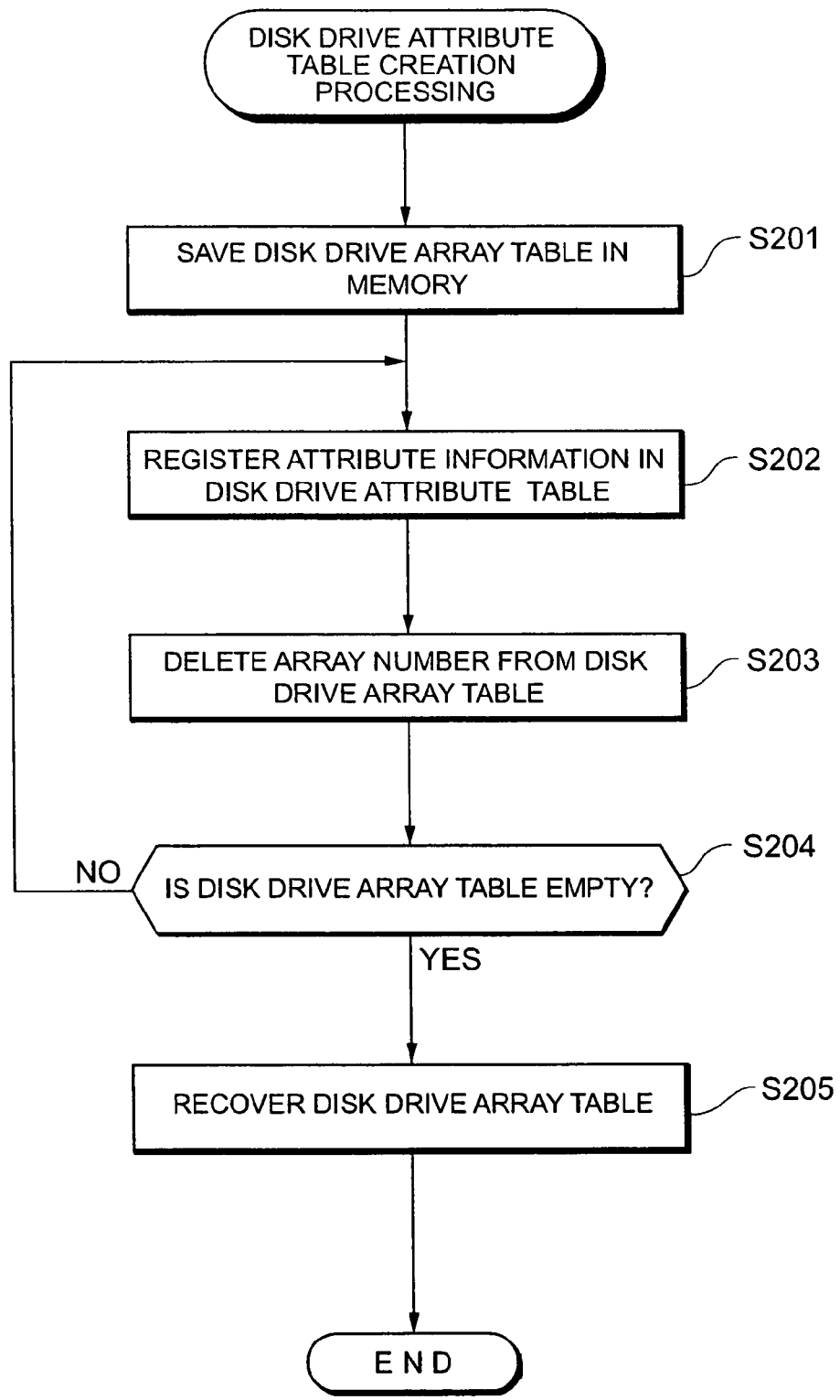
FIG. 12 is a flowchart showing disk drive attribute table creation processing.

FIG. 12 is a flowchart showing disk drive attribute table creation processing. The disk drive attribute table creation processing is executed by the CPU 12 pursuant to the activation of the storage system 10.

When the disk drive attribute table creation processing is activated, the CPU 12 saves the disk drive array table 40 in the memory 13 (S201). Then, the CPU 12 sequentially selects a plurality of array numbers stored in the disk drive array table 40, issues an inquiry command to the disk drives 150 having the selected array number, acquires attribute information of the respective disk drives 150, and registers the acquired attribute information in the disk drive attribute table 80 (S202). Details of the inquiry command are prescribed in the SCSI protocol, and the return value of the inquiry command includes the vendor name, HDD type, storage capacity, model name and so on of the disk drives 150. Attribute information of the disk drive 150 can also be acquired using the SMART (Self Monitoring and Reporting Technology) function of the disk drives 150.

Next, the CPU 12 deletes from the disk drive array table 40 the array numbers of the disk drives from which attribute information has been acquired (S203).

Next, the CPU 12 determines whether the disk drive array table 40 is empty (S204), and, if it is not empty (S204; NO), the CPU 12 repeatedly executes the loop of S202 to S204. If the disk drive array table 40 is empty (S204; YES), the CPU 12 recovers the disk drive array table 40 (S205).

Figure 13:
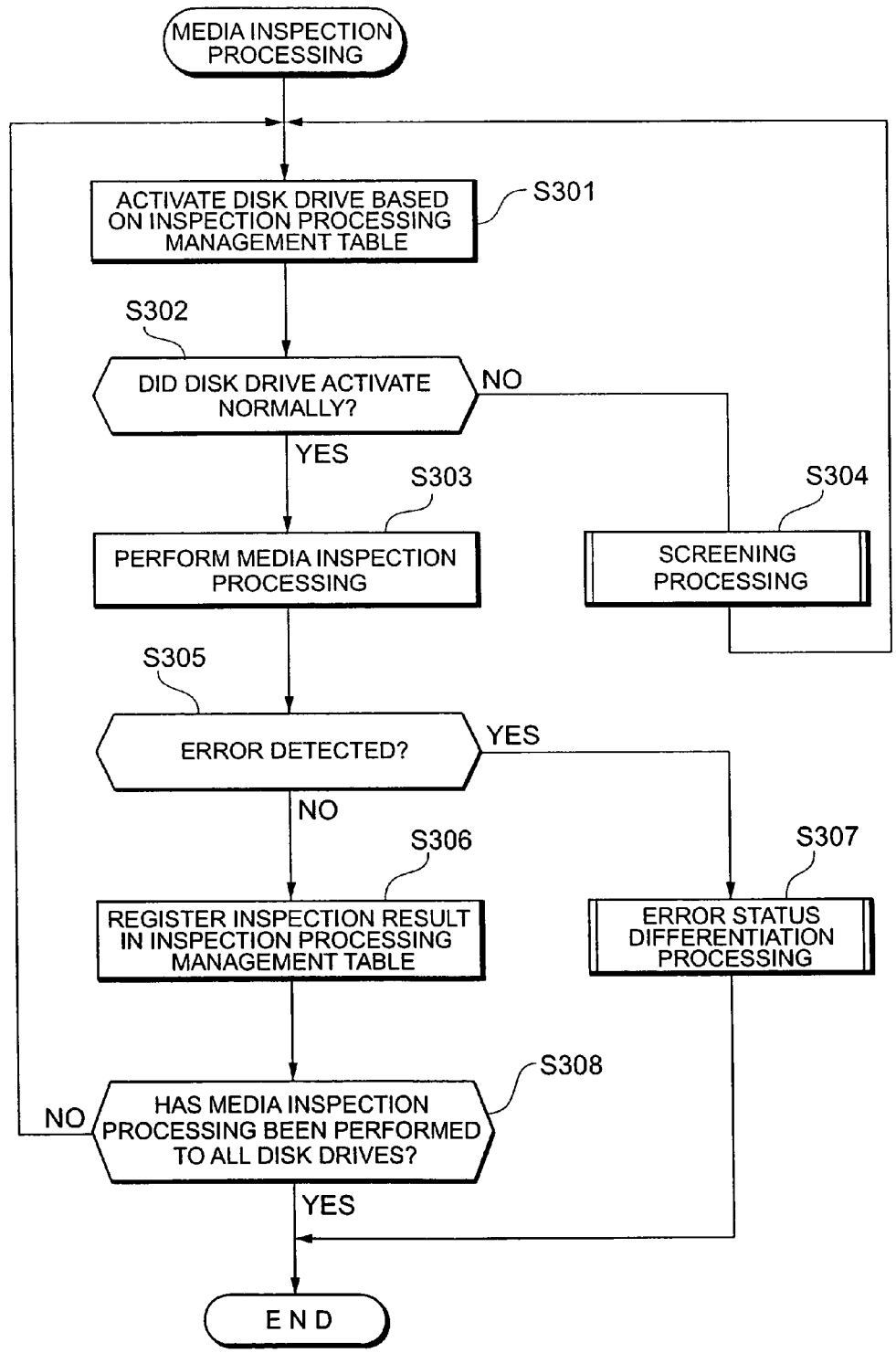
FIG. 13 is a flowchart showing media inspection processing.

FIG. 13 is a flowchart showing media inspection processing. The media inspection processing is a background process to be operated in the background of a host access. The timing of performing media inspection processing is predefined by a policy, but if a policy is not defined, this is performed at the timing set as default (e.g., periodical timing such as once a month).

When the media inspection processing is activated, the CPU 12 foremost reads the RG numbers registered in the column of "inspection order" of the inspection processing management table 70 as per the inspection order, and activates all disk drives 150 belonging to the RAID group having the read RG number (S301).

Next, the CPU 12 checks whether the disk drives 150 configuring the RAID group can be activated normally (S302). If the disk drives 150 cannot be activated normally (S302; NO), the CPU 12 performs screening processing (S304), and returns to the processing of S301. Details regarding the screening processing will be described later.

Meanwhile, if the disk drives 150 can be activated normally (S302; YES), the CPU 12 performs media inspection processing according to the inspection level (S303).

Next, the CPU 12 checks whether there is an error in the disk drives 150 as a result of the media inspection (S305). If there is an error in the disk drives 150 (305; YES), the CPU 12 performs error status differentiation processing (S307). Details regarding the error status differentiation processing will be described later.

Meanwhile, if there is no error in the disk drives 150 (S305; YES), the CPU 12 records the inspection result (inspected final LBA and inspection completion time) in the inspection processing management table 70 (S306).

Next, the CPU 12 checks whether media inspection processing has been performed to all disk drives 150 (S308). If media inspection processing has not been performed to certain disk drives 150 (S308; NO), the CPU 12 returns to the processing of S301. Meanwhile, if media inspection processing has been performed to all disk drives 150 (S308; YES), the CPU 12 ends the media inspection processing.

Figure 14:
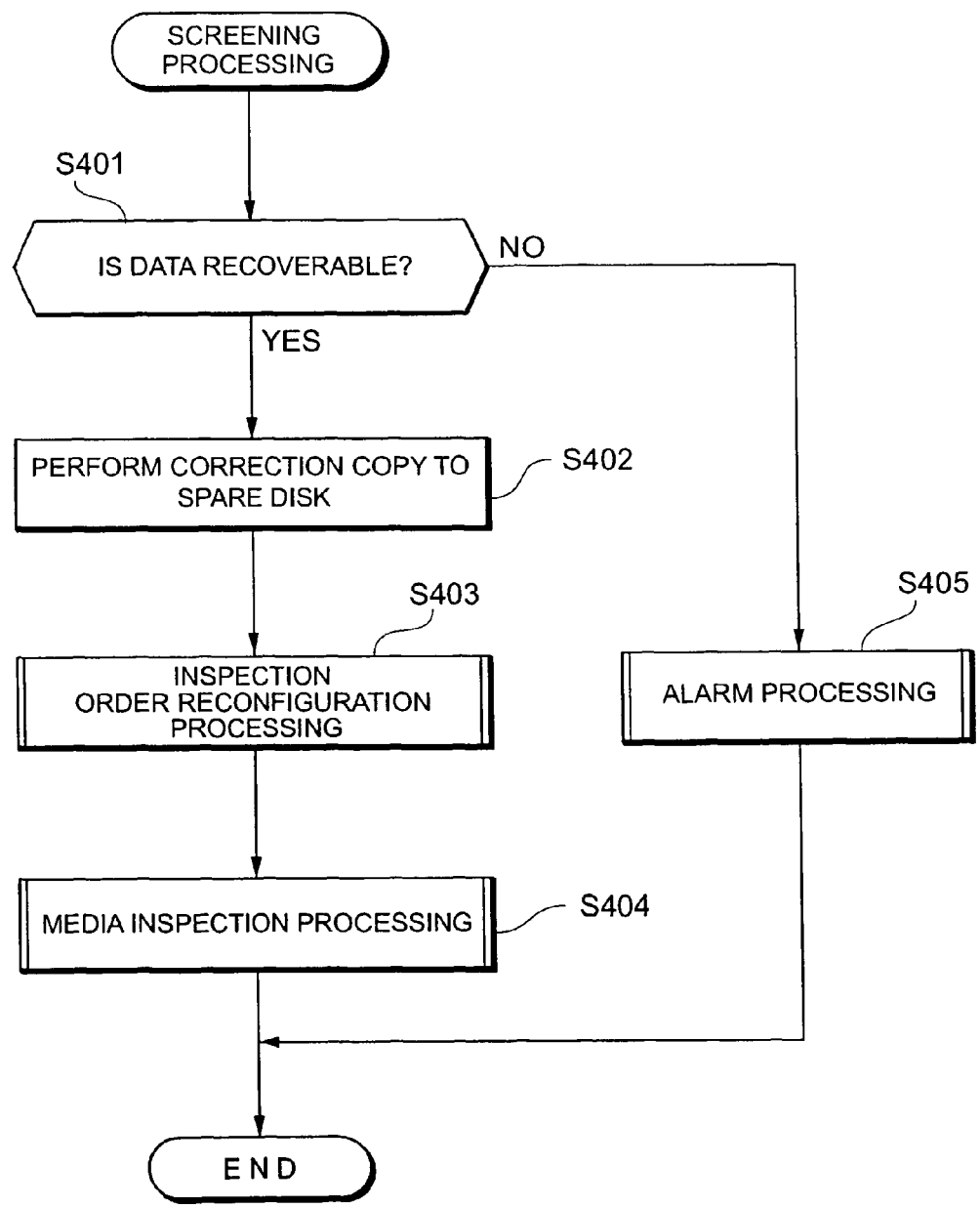
FIG. 14 is a flowchart showing screening processing.

FIG. 14 is a flowchart showing screening processing. The screening processing is performed when it is determined that the disk drive 150 cannot be activated normally in the media inspection processing (FIG. 13) (S302; NO), or when an error count exceeds a specified value in the error status differentiation processing (FIG. 17) (S705; YES).

When the screening processing is activated, the CPU 12 foremost checks whether data can be recovered with another disk drive 150 of the RAID group to which belongs the disk drive 150 that cannot be activated normally or the disk drive 150 in which the error count exceeded a specified value (S401). If data recovery is not possible (S401; NO), the CPU 12 performs alarm processing (S405). Details regarding the alarm processing will be described later.

Meanwhile, if data recovery is possible (S401; YES), the CPU 12 performs correction cop to the spare disk and restores the data (S402).

Next, the CPU 12 reconfigures the "inspection order" registered in the inspection processing management table 70 (S403), and performs media inspection processing based on the inspection processing management table 70 after the inspection order reconfiguration (S404).

Figure 15:
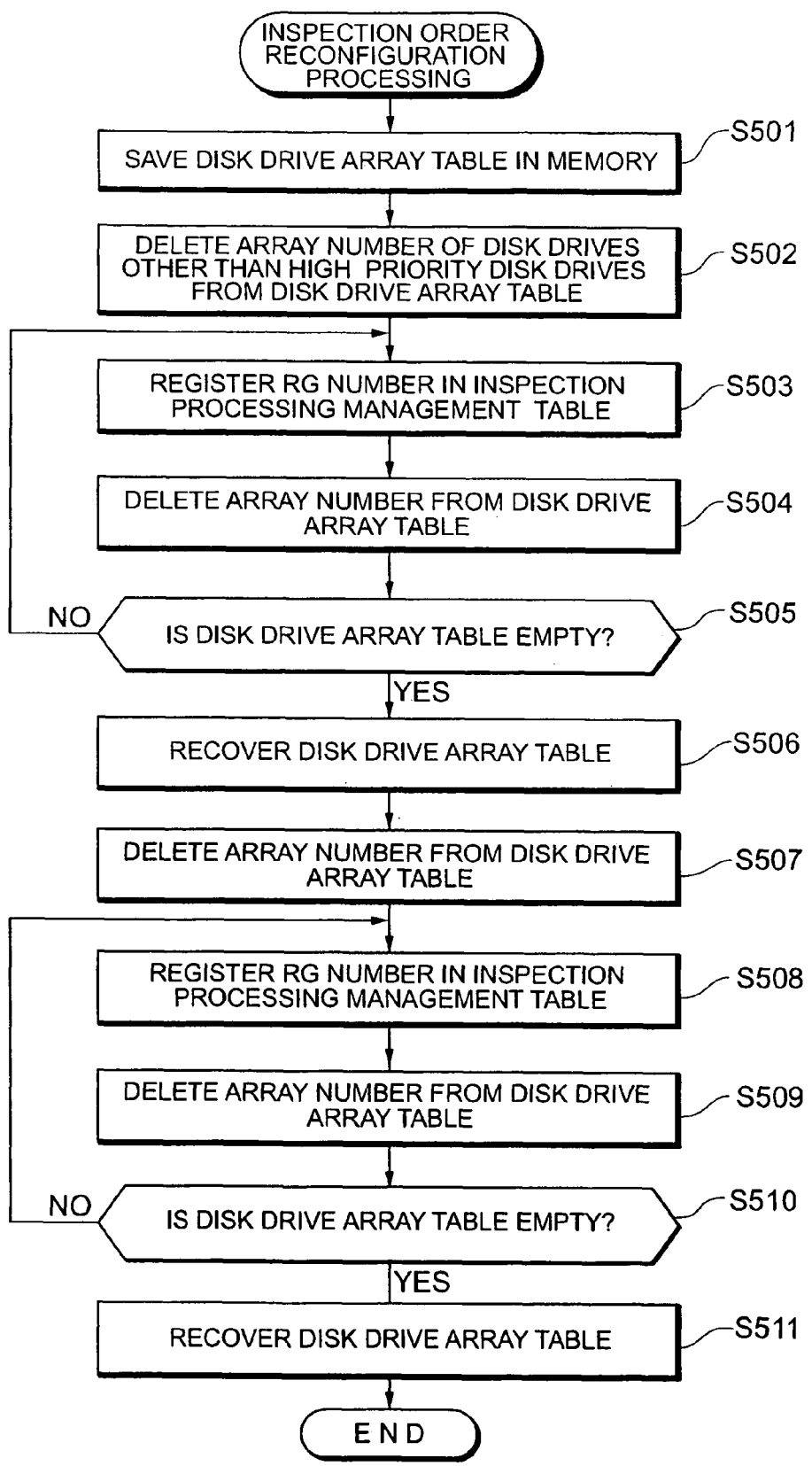
FIG. 15 is a flowchart showing inspection order reconfiguration processing.

FIG. 15 is a flowchart showing inspection order reconfiguration processing. The inspection order reconfiguration processing is processing to be performed when there is some kind of failure in the disk drive 150, such as when the disk drive 150 cannot be activated normally or the error count value exceeds a specified value, for raising the inspection of the disk drives 150 having attribute information coinciding with attribute information with high "priority" in the disk drive attribute table 80 among the attribute information of the disk drive 150 subject to a failure.

Incidentally, upon activating the inspection order reconfiguration processing, let it be assumed that the "RG numbers" in the inspection processing management table 70 are initialized (returned to a blank space).

When the inspection order reconfiguration processing is activated, the CPU 12 foremost stores the disk drive array table 40 in the memory 13 (S501), and deletes from the disk drive array table 40 the array numbers of disk drives 150 other than the disk drives having attribute information coinciding with attribute information with high "priority" (e.g., attribute information in which the priority is set to "1") in the disk drive attribute table 80 among the attribute information of the disk drive 150 subject to a failure (S502).

Next, the CPU 12 registers the RG number, to which belongs a disk drive 150 having the smallest array number among a plurality of array numbers stored in the disk drive array table 40, in a blank space of "inspection order" of the inspection processing management table 70 (S503). Here, when the disk drive 150 having the smallest array number is an unused disk or spare disk, an unused disk number or spare disk number is registered in the blank space of "inspection order" of the inspection processing management table 70.

Next, the CPU 12 deletes from the disk drive array table 40 the array number of all disk drives 150 belonging to the RAID group having the RG number registered in the blank space of "inspection order" of the inspection processing management table 70 (S504).

Next, the CPU 12 determines whether the disk drive array table 40 is empty (S505), and, if it is not empty (S505; NO), the CPU 12 repeatedly executes the loop of S503 to S505. If the disk drive array table 40 is empty (S505; YES), the CPU 12 recovers the disk drive array table 40 (S506).

Next, the CPU 12 refers to the RAID configuration management table 50, and deletes from the disk drive array table 40 the array number of all disk drives 150 belonging to the RAID group having the RG number registered in the column of "RG number" of the inspection processing management table 70 (S507).

Next, the CPU 12 registers the RG number, to which belongs a disk drive 150 having the smallest array number among a plurality of array numbers stored in the disk drive array table 40, in a blank space of "inspection order" of the inspection processing management table 70 (S508). Here, when the disk drive 150 having the smallest array number is an unused disk or spare disk, an unused disk number or spare disk number is registered in the blank space of "inspection order" of the inspection processing management table 70.

Next, the CPU 12 deletes from the disk drive array table 40 the array number of all disk drives 150 belonging to the RAID group having the RG number registered in the blank space of "inspection order" of the inspection processing management table 70 (S509).

Next, the CPU 12 determines whether the disk drive array table 40 is empty (S510), and, if it is not empty (S510; NO), the CPU 12 repeatedly executes the loop of S508 to S510. If the disk drive array table 40 is empty (S510; YES), the CPU 12 recovers the disk drive array table 40 (S511).

Incidentally, in the foregoing explanation, although an example was illustrated for raising the inspection order disk drives 150 having attribute information coinciding with attribute information with high "priority" (e.g., attribute information in which the priority is set to "1") in the disk drive attribute table 80 among the attribute information of the disk drive 150 subject to a failure, and deciding the inspection order of the other disk drives 150 based on the array number in the disk drive array table 40, the present embodiment is not limited thereto. For example, the operation of raising and setting the inspection order of the disk drives 150 having attribute information coinciding with attribute information in which the "priority" is set to "1" in the disk drive attribute table 80 among the attribute information of the disk drive 150 subject to a failure, raising and setting the inspection order of the disk drives 150 having attribute information coinciding with attribute information in which the "priority" is set to "2" in the disk drive attribute table 80 among the attribute information of the disk drive 150 subject to a failure, and raising and setting the inspection order of the disk drives 150 having attribute information coinciding with attribute information in which the "priority" is set to "3" in the disk drive attribute table 80 among the attribute information of the disk drive 150 subject to a failure can be sequentially repeated.

Further, since the flowchart shown in FIG. 13 is an algorithm wherein when the inspection order is reconfigured with the screening processing, the media inspection processing is performed once again from the start based on the inspection processing management table 70 after the inspection order has been reconfigured, with respect to the RAID group, spare disk drive and unused disk drive already subject to media inspection processing that are targets of reinspection, an inspection complete flag may be set so as to omit the reinspection of the RAID group, spare disk drive and unused disk drive to which such inspection complete flag has been set.

Figure 16:
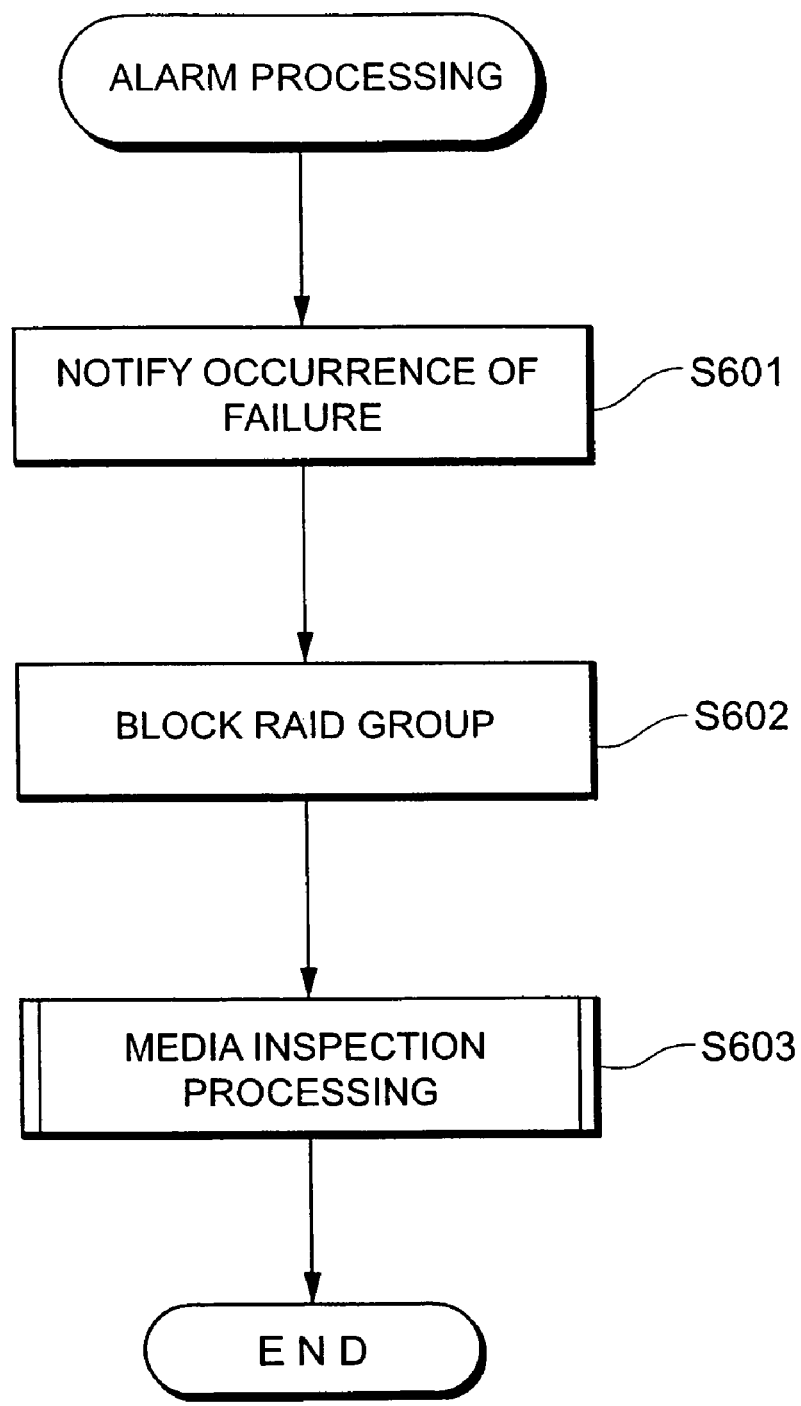
FIG. 16 is a flowchart showing alarm processing.

FIG. 16 is a flowchart showing alarm processing. The alarm processing is performed when data recovery is determined to be impossible (S401; NO) in the screening processing (FIG. 14), or when data recovery is determined to be impossible (S702; NO) in the error status differentiation processing (FIG. 17).

When the alarm processing is activated, the CPU 12 foremost notifies the occurrence of a failure to the user (S601), blocks the RAID group to which belongs the disk drive 1500 subject to a failure (S602), and performs media inspection processing to the other RAID groups (S603).

Figure 17:
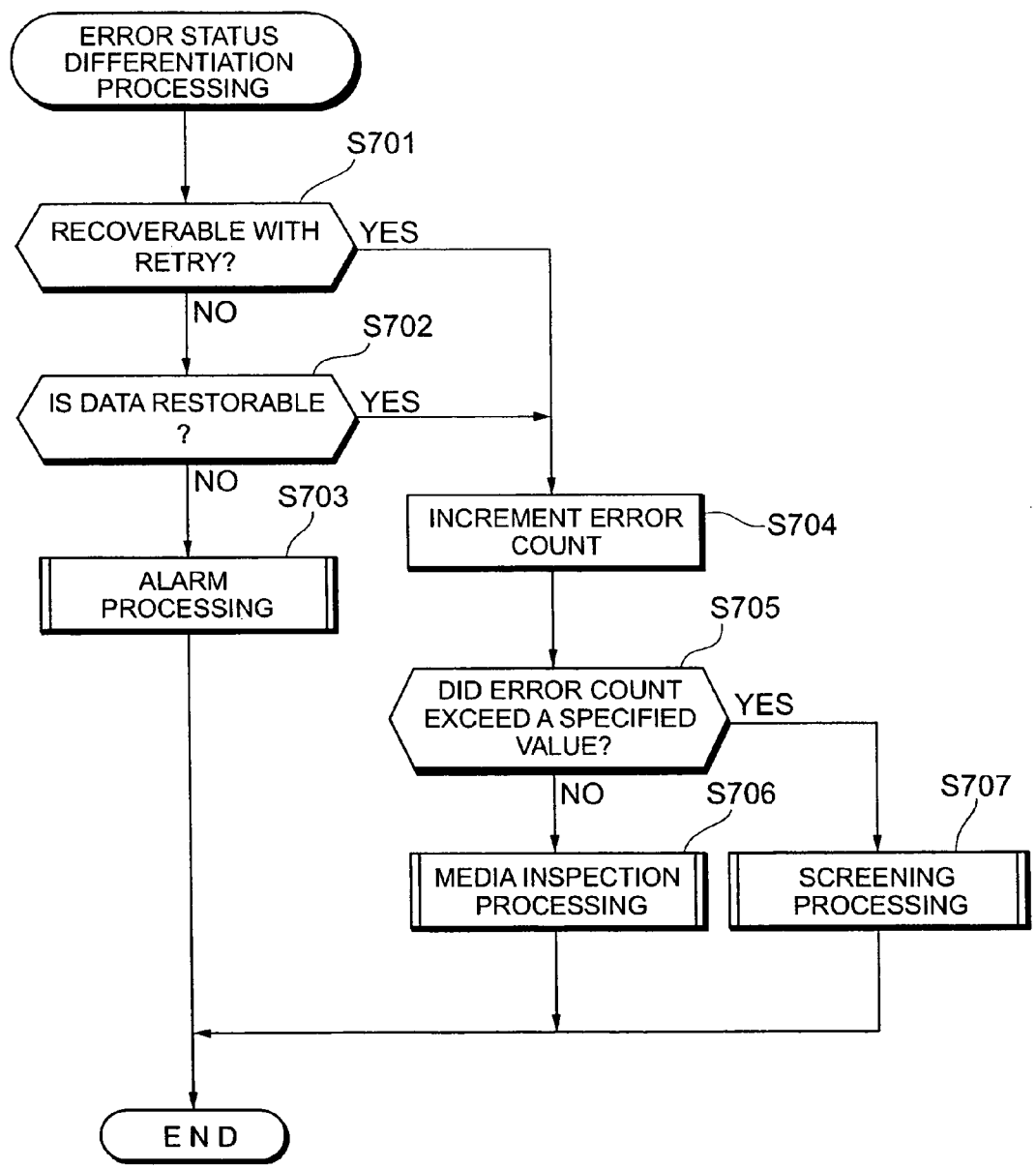
FIG. 17 is a flowchart showing error status differentiation processing.

FIG. 17 shows a flowchart of error status differentiation processing. The error status differentiation processing is performed when an error is detected in the disk drive 150 (S305; YES) in the media inspection processing (FIG. 13).

When the error status differentiation processing is activated, the CPU 12 foremost checks whether the disk drive 150 detected with an error can be recovered with retry (S701). If the disk drive 150 cannot be recovered with retry (S701; NO), the CPU 12 checks whether data of the disk drive 150 can be recovered (S702). If data recovery is not possible (S702; NO), the CPU 12 performs alarm processing (S703).

Meanwhile, if the disk drive 150 can be recovered with retry (S701; YES), or data recovery of the disk drive 150 is possible (S702; YES), the CPU 12 increments the error count (S704), and checks whether the error count exceeds a specified value (S705).

If the error count exceeds a specified value (S705; YES), the CPU 12 performs screening processing (S707). If the error count does not exceed a specified value (S705; NO), the CPU 12 performs media inspection processing (S706).

Incidentally, in the foregoing explanation, although an example was illustrated for performing media inspection processing to all or a part of the disk drives 150 belonging to the same RAID group, the media inspection processing may also be performed to all or a part of the disk drives 150 belonging to the same logical unit.

Further, if media inspection processing is performed frequently, there are drawbacks in that the life duration of the disk drive 150 may shorten, or the power consumption may increase. Thus, it is preferable to exclude the disk drives 150, in which a prescribed period has not elapsed from the latest data access from the disk controller 140, from the target of media inspection.

When a cooling fan for cooling the disk drives 150 is provided to the respective disk boxes 15, it is preferable to turn on the power source of the disk drives 150 to be subject to media inspection processing to the extent that the rotating speed of the cooling fan does not exceed a prescribed rotating speed. If the number of disk drives to be subject to the media inspection processing increases, the power consumption will also increase. Thus, the overall power consumption of the storage system 10 can be suppressed by performing media inspection processing upon giving consideration to the power consumption of accessories of the storage system 10.

Further, with respect to a RAID group of RAID 4 having a RAID configuration of 3D+1P, it is possible to perform media inspection processing only the 3D disk drives 150.

Further, the storage system 100 does not necessarily have to include a plurality of disk drives 150, and the media inspection processing can still be applied even if it only includes a single disk drive 150.

According to the present embodiment, since the power source of the disk drive 150, which was turned off due to the decrease in data access frequency, is autonomously turned on irrespective of the data access status and subject to media inspection processing, it is possible to discover a failure in the disk drive at an early stage and prevent data loss from occurring. Further, as a result of selecting the disk drive 150 to be subject to media inspection processing based on a policy, it is possible to efficiently perform media inspection processing.

What is claimed is:

1. A storage system, comprising: a plurality of disk drives storing data used by a host computer; a disk controller configured to control data access to said disk drives, providing a plurality of storage layers configured by said disk drives, and controlling to change a power mode of said disk drives from an access mode in which said disk drives are operating to write data to a power saving mode; a power supply controller configured to autonomously turn off a power source of at least one of said disk drives according to said disk controller, and autonomously turn on the power source of said disk drive which was turned off, after the lapse of a prescribed period from the time said power source was turned off, irrespective of data access status to said disk drive which was turned off in order to inspect by an inspection process a failure in said disk drive; wherein said disk controller controls the inspection process of said disk drive which was turned off corresponding to each storage layer; and wherein said power supply controller selects said disk drive for turning on the power source irrespective of the data access status to said disk drive based on a predefined policy.

2. The storage system according to claim 1, wherein said predefined policy is to periodically turn on a power source of said disk drive which was turned off in a prescribed inspection cycle irrespective of the data access status to said disk drive.

3. The storage system according to claim 2, wherein said inspection process differs according to the storage layers.

4. The storage system according to claim 2, wherein an inspection level differs according to the storage layers.

5. The storage system according to claim 4, wherein said inspection level is one of: (1) read the entire storage area of all disk drives belonging to the same RAID group, and inspect a failure; (2) read a part of the storage area of all disk drives belonging to the same RAID group, and inspect a failure; or (3) check whether all disk drives belonging to the same RAID group can enter a ready state.

6. The storage system according to claim 2, wherein said inspection process differs according to the disk drive type of said disk drive which was turned off.

7. The storage system according to claim 1, wherein said predefined policy is to preferentially select a disk drive containing attribute information that coincides with or is similar to attribute information of a disk drive subject to a failure.

8. The storage system according to claim 1, wherein said predefined policy is to preferentially select a disk drive containing attribute information that coincides with or is similar to attribute information with high priority among the attribute information of a disk drive subject to a failure.

9. The storage system according to claim 1, wherein said predefined policy is to exclude a disk drive, in which a prescribed period has not elapsed from the latest data access from said disk controller, from the target of media inspection.

10. The storage system according to claim 1, wherein said disk controller inspects a failure in said disk drives based on the predefined policy.

* * * * *